July 15, 1958      J. M. CLUWEN      2,843,742

DEVICE FOR MAINTAINING MECHANICAL OSCILLATIONS

Filed Oct. 27, 1955      3 Sheets-Sheet 1

INVENTOR
JOHANNES MEYER CLUWEN

BY *Fred M. Vogel*

AGENT

July 15, 1958 J. M. CLUWEN 2,843,742
DEVICE FOR MAINTAINING MECHANICAL OSCILLATIONS
Filed Oct. 27, 1955 3 Sheets-Sheet 2
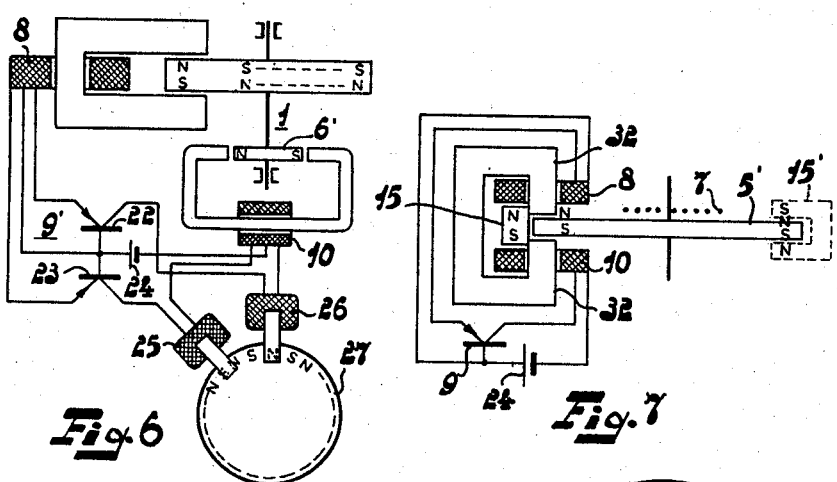
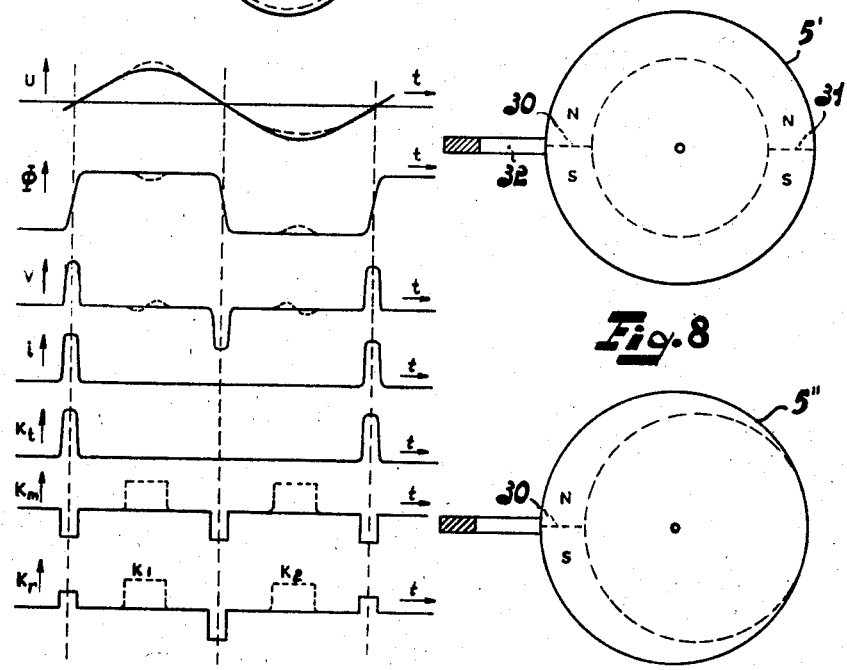
INVENTOR
JOHANNES MEYER CLUWEN
BY
AGENT July 15, 1958 J. M. CLUWEN 2,843,742
DEVICE FOR MAINTAINING MECHANICAL OSCILLATIONS
Filed Oct. 27, 1955 3 Sheets-Sheet 3

INVENTOR
JOHANNES MEYER CLUWEN

BY
AGENT

United States Patent Office 2,843,742
Patented July 15, 1958

2,843,742

DEVICE FOR MAINTAINING MECHANICAL OSCILLATIONS

Johannes Meyer Cluwen, Eindhoven, Netherlands, assignor, by mesne assignments, to North American Philips Company, Inc., New York, N. Y., a corporation of Delaware Application October 27, 1955, Serial No. 543,178

Claims priority, application Netherlands November 6, 1954

10 Claims. (Cl. 250—36)

The present invention relates to a mechanically oscillating device. More particularly, the invention relates to devices for maintaining mechanical oscillations in an oscillatory system by means of electric pulses produced during determined phase intervals of the oscillations, which pulses supply the energy required for maintaining the oscillations via a driving coil to the said system. Such devices are used, for example, for electric clockworks, in which the pendulum and the balance are maintained oscillating in the indicated manner.

In a known construction of an electric pendulum clockwork, the arm of the pendulum closes a contact at each of its two extreme positions and at such moment a current pulse is produced and supplied to a coil, causing the pendulum to be driven back to its center position. However, the oscillation period of a pendulum thus driven is found to be dependent to a greater or lesser extent upon the energy of the current pulse and this may result in false indications of the clockwork.

The object of the invention is to reduce this dependency to a minimum, and in accordance with the invention, the driving force pulses exerted upon the oscillatory system occur about the zero positions of the oscillating movement approximately with reflectional symmetry. It is based upon the recognition that driving the system at the moment of the zero position of the oscillation leads to an oscillation period independent of the driving energy. This results, for example, in the advantage that the journalling of the oscillatory system is not required to be substantially free from damping and this may result in a considerable saving of cost. When the oscillatory system is driven mechanically it is in practice very difficult to drive the system at exactly the moment of zero position of the oscillations. However, with electrical drive, this requirement may be fulfilled very satisfactorily.

In order that the invention may be readily carried into effect, it will now be described, by way of example, with reference to the accompanying drawings, wherein:

Fig. 6 is a modification of the embodiment of Fig. 1;

Fig. 7 is a modification of the embodiment of Fig. 5;

Figs. 8 and 10 are plan views of a portion of the embodiment of Fig. 7;

Figs. 9 and 11 are time diagrams which serve to explain the operation of Fig. 7 in connection with Figs. 8 and 10;

Figure 1:
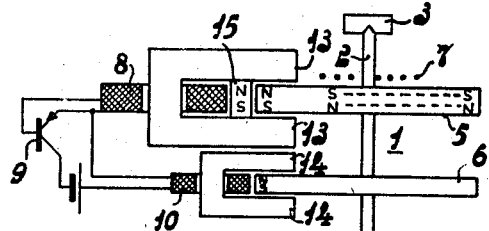
Fig. 1 is a schematic diagram of an embodiment of the oscillating device of the present invention.

The device shown in Fig. 1 comprises an oscillatory system 1, for example the balance of an electric clockwork, comprising a shaft 2 and bearings 3 and 4, a disc 5, provided on the shaft and consisting of permanent or hard-magnetic material, for example Ferroxdure, a rod 6 of high-permeable or weak-magnetic material, for example ferrite, and a spring 7, the rigidity of which in combination with the inertia moments of the disc 5 and the rod 6 determines the oscillation period of the system 1. In a manner which will be described hereinafter, the disc 5 produces electrical pulses in a "pick-up" coil 8, which pulses after being amplified in an amplifier 9, more particularly a class B transistor amplifier, are supplied to a driving coil 10, which attracts the rod 6 so as to maintain the oscillation of the system 1.

Figure 2:
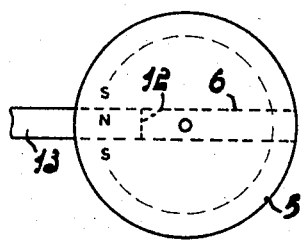
Fig. 2 is a plan view of a portion of the embodiment of Fig. 1.

For this purpose, the disc 5 is magnetized in the axial direction, i. e. in Figs. 1 and 2 substantially the whole upper surface of said disc constitutes a pole surface S having south magnetism and substantially the whole lower surface thereof constitutes a pole surface N having north magnetism. However, at one erea as indicated by 12 in Fig. 2, the direction of magnetization N–S is exactly opposite, so that the upper surface has north magnetism and the lower surface has south magnetism. When the area 12 moves through the limbs 13 of coil 8, the polarity of the magnetic flux thus abruptly changes, resulting in a pulse being produced in the coil 8. The spring 7 is clamped in position in a manner such that the zero position of the oscillation corresponds to the position at which the area 12 is opposite the limbs 13. The rod 6 is then exactly midway between the limbs 14 of coil 10.

Figure 3:
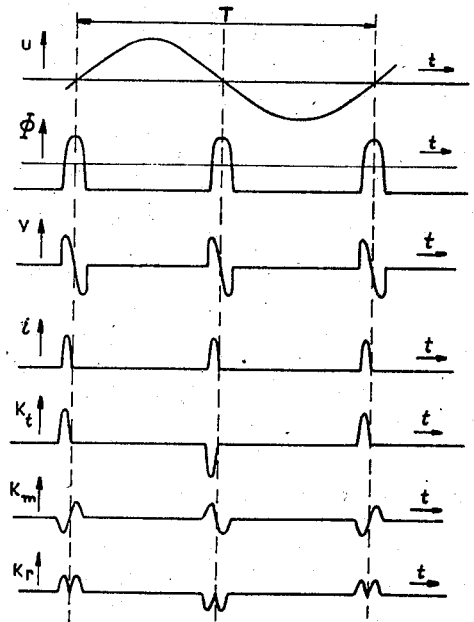
Figs. 3 and 4 are time diagrams which serve to explain the operation of Fig. 1.

Fig. 3 shows, as a function of the time $t$, the sinusoidal deviation $u$, of the oscillation, the magnetic flux $\Phi$ flowing through the limbs 13 of coil 8, the voltage V produced in coil by the said flux, the current $i$ thus produced in the output of the amplifier 9 and supplied to the coil 10, and the driving force $K_t$ thus exerted upon the rod 6. The force $K_t$ is shown to have opposite polarity, if it corresponds to one sense of rotation, for example the anti-clockwise direction, and negative polarity, if it corresponds to the opposite sense of rotation, for example the clockwise direction, of the disc 5. For the sake of clarity, the time scale is shown a little elongated in the vicinity of the pulses, but the pulses usually have a shorter duration as compared with the time intervals between them.

It will be seen from Fig. 3 that the force pulses $K_t$ always occur just before the oscillation passes through its zero position, which latter moment is represented by the vertical dotted lines. Consequently, the oscillation period T still depends upon the value of the force $K_t$ and this is undesirable. In said known device, this disadvantage becomes manifest even to a greater extent, since the force occurs therein with changing polarity at the moments at which the deviation $u$ of the oscillation is maximum. Said disadvantage cannot be mitigated by different stressing of the spring 3, or by giving the rod 6 a different position with respect to the area 12 on the disc 5, since in this case it is possible for one direction of movement, but never possible at the same time for the opposite direction of movement to obtain a driving force which varies symmetrically with respect to the zero point.

In Fig. 1, this problem has been solved by the use of a small magnet 15 between the limbs 13 of coil 8. The magnet 15 together with the disc 5, brings about, a braking force as a result of its repelling action just before the zero position of the movement is reached and brings about a driving force just after the zero position has been passed. This variation of force is indicated by $K_m$ in Fig. 3. Consequently, when $K_m$ is correctly adjusted with respect to $K_t$, for example by suitable adjustment of the strength of the magnet 15, the resulting force $K_r$ exerted upon the oscillatory system 5, 6 varies symmetrically with respect to the said zero position, so that the said disadvantage is avoided. The amplitude of $K_t$ in this case must be twice that of $K_m$.

The symmetry of $K_r$ is liable to be somewhat disturbed by variation of $K_t$, but the error resulting therefrom is one order of magnitude smaller than that in the absence of the magnet 15. In order to obtain this adjustment it is not necessary for the magnet 15 to be of a material similar to that of the disc 5, it being possible for the magnet 15 to be made, for example, of material having a considerably higher remanence than that of the disc 5.

From the foregoing it appears that the rod 6 may alternatively have the form of a permanent magnet, for example having a direction of magnetization parallel to that of the disc 5. The weak-magnetic limbs 14 of the coil 10 then bring about a similar force as the force $K_m$, but with smaller amplitude and opposite phase, so that with proper adjustment of the amplitude of $K_t$ it is possible to obtain a resulting force $K_r$ which varies symmetrically with respect to the zero position of the movement, but the amplitude of which is smaller than that if the rod 6 were weak-magnetic. This may be advantageous, if the $K_t$ pulses are small.

Figure 4:
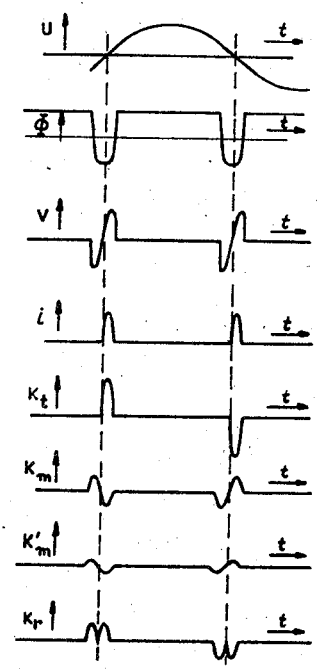

In Fig. 3, it has been taken for granted that the class B amplifier 9 only passes currents $i$ corresponding to the positive halves of the voltage pulses V and hence corresponding to the pulses which occur just before the zero point of the movement. However, by changing the polarities of the disc 5, it is possible with the above-mentioned assumption to utilize in a similar manner the pulses which occur just after the zero point of the movement, the driving force $K_t$ produced then bringing about a repulsion of the permanent magnetic rod 6. Fig. 4 shows the flux $\Phi$ which then flows through the limbs 13, the voltage V across the coil 8, the current $i$ through the coil 10 and the driving force $K_t$ produced by the current $i$. The dotted lines, as before, represent the zero-point of the movement having a deviation $u$. The polarity of the force $K_m$ exerted upon the disc 5 by the magnet 15 is now inverted and hence in phase with the force $K_m'$ of the limbs 14 exerted upon the rod 6 which is assumed to be permanent magnetic. The resulting force $K_r$ of the forces $K_t$, $K_m$ and $K_m'$ exerted upon the system 5, 6 may, with proper adjustment, thus vary exactly symmetrically with respect to the zero position of the movement.

Other modifications may be provided, for example, by reversing the winding direction of the coils 8 and 10, by making not only the rod 6 permanent magnetic, but also by arranging a small permanent magnet between the limbs 14 of coil 10, or by arranging the said magnet and/or the magnet 15 in series with the weak-magnetic circuit of the limbs 14, 13 respectively. An example of the latter case is shown in Fig. 5.

Figure 5:
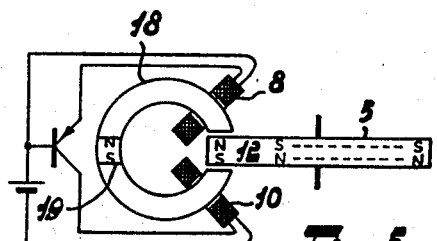
Fig. 5 is a simplification of the embodiment of Fig. 1.

In the embodiment shown in Fig. 1, the lower limb 13 and the upper limb 14 could be used in common, whereas in Fig. 5 the two cores are wholly united to form a core 18 on which the two coils 8 and 10 are arranged. At the moment at which the area 12, of opposite direction of magnetization on the disc 5, passes along the limbs of the core 18, voltage pulses V similar to those of Fig. 3 or Fig. 4 are induced in the coil 8. The corresponding current pulses $i$ supplied to the coil 10 then cause attraction of the disc 5 according to force pulses $K_t$. As before, an additional force $K_m$ is exerted upon the disc 5 by an auxiliary magnet 19 arranged in series with the magnetic circuit of the core 18. Thus, by correct proportioning, whereby the force $K_t$ has an amplitude twice that of the force $K_m$, a resulting force $K_r$ exerted upon the disc 5 varies exactly symmetrically with respect to the zero position of the movement. If desired, the magnet 19 may be in the form of a thin flat magnet whose pole surfaces extend substantially in parallel to the center line of the weak-magnetic circuit 18. However, similar to Fig. 1, the disadvantage remains that variations of $K_t$ result in slight asymmetry of $K_r$.

This disadvantage is avoided in the embodiment of Fig. 6, since in Fig. 6 both the positive and the negative voltage pulses V produced across the coil 8 are amplified and transmitted to the coil 10, in which they act upon a permanent magnetic rod 6' which is connected to the oscillatory circuit 1, and which thus is subject to a driving force just before the zero position of the movement is reached and subject to a repelling force a short time thereafter. The amplifier 9 for this purpose preferably comprises two class-B transistors 22 and 23, so that energy loss from the source of supply 24 when the system 1 is at rest is substantially avoided.

Fig. 6 shows an embodiment for driving the hands of a clockwork thus controlled. The positive and negative current pulses produced by the transistors 22, 23, respectively, are for this purpose supplied separately to two coils 25, 26, respectively, which cooperate with a magnet disc 27 having an axial direction of magnetization, whose polarity alternately changes. The small phase-shift, between the positive and negative current pulses thus results in a step-wise displacement of the disc 27, which may be transmitted to the hands of a clockwork. For the sake of clarity, the disc 27 is shown with its axis at right angles to the plane of the drawing, but it will usually be rotated a quarter of a stroke, so that its axis is parallel to that of the system 1.

Fig. 7 is a modification of the embodiment of Fig. 5 in which the disadvantage of a resulting driving force which is still subject to asymmetry may be avoided in a different manner. The disc 5', which corresponds to the disc 5, is magnetized in such manner (see Fig. 8) that the polarity of the axial direction of magnetization is abruptly reversed at two diametrically opposite areas 30 and 31, whereas the polar strength between the areas 30 and 31 remains constant.

Assuming for the time being that the deviation $u$ of the disc 5' remains smaller than 180° (the areas 30 and 31 would be exactly changed at 180°) then only at the moment at which the area 30 passes along the limbs 32, the magnetic flux $\Phi$ through said limbs undergoes a step-wise variation, as shown in Fig. 9. This results in a voltage V being induced in the coil 8, leading to a current $i$ in the coil 10 and hence to a driving force $K_t$. By the arrangement of the magnet 15 between the limbs 32, a force $K_m$ is in addition, exerted upon the disc 5', so that a resulting force $K_r$ is ultimately exerted upon the disc 5', which varies symmetrically with respect to the zero positions of the movement $u$ as indicated by the vertical dotted lines. If desired, the magnet 15 may be replaced by a magnet 15' which cooperates with the area 31.

The magnet 15 is preferably given a polarity at which the forces $K_t$ and $K_m$ are oppositely directed, that is, in that phase in which the magnet 15 would brake the disc 5', the amplifier 9 is released, so that the braking action is counteracted. Furthermore, the force $K_t$ is preferably chosen to be equal to or greater than twice the force $K_m$, so that for $K_r$ a variation of forces is obtained as shown in Fig. 9. The conditions specified are by no means necessary, however, to ensure satisfactory operation.

Figure 15:
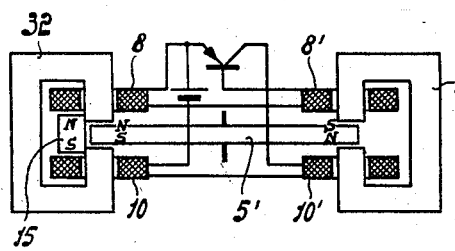
Fig. 15 is another modification of the embodiment of Fig. 7.

In order to obtain greater pulses, it is possible according to Fig. 15 to make a similar circuit 8', 10', 32' cooperate with the area 31 (see Fig. 8) of the disc 5' and to connect the corresponding coils 8, 8' and 10, 10' in series. As a further alternative, the coils 8, 8' and 10' may be connected in series for producing the voltage pulses and only the coil 10 may be used for producing the driving force $K_t$.

If the amplitude of the oscillation is more than 180°, the area 31 also periodically interacts with the limbs 32 of the coils 8 and 10, but since at this area the speed of movement of the disc 5' is much less than in the vicinity of the zero position of the movement, the corresponding variation in flux, and hence the voltage induced in the coil 8, is smaller than at the time of the zero positions. The variation of the different magnitudes in this case is shown in dotted lines in Fig. 9, it being assumed that the said small voltage pulses remain smaller than the natural threshold voltage of the transistor 9.

From the variation of the resulting force $K_r$ it appears that, as before, an exactly symmetric variation of forces with respect to the zero positions of the movement is obtained. Nevertheless, the additional forces $K_1$ and $K_2$ which may be produced by interaction of the area 31 with the limbs 32 and which can then occur in the resulting force $K_r$ are mostly undesirable, since the force $K_2$ causes the disc 5' to be braked, so that the deviation $u$ at this area is decreased, but the force $K_1$ on the contrary drives the disc 5', so that the deviation $u$ at this area is increased, which may lead to unwanted errors in the oscillation period.

Figure 11:
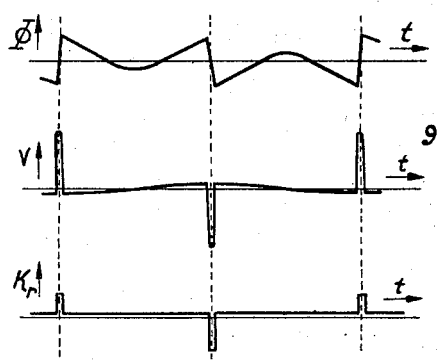

In order to obviate the said disadvantage, use may be made, according to Fig. 10, of a disc 5 likewise having a magnetization of changing polarity at the area 30, but the polar strength of which gradually decreases from the area 30 along the further circumference of the disc 5'', for example due to gradual decrease of the pole surface. In Fig. 11, the flux $\Phi$ which flows during the intervals between the zero positions of the movement then exhibits only gradual variations leading to voltages V, which preferably remain below the threshold voltage of the transistor, and hence to a resulting force $K_r$ which possibly may require a certain preliminary tension of the spring 7, in order to compensate for the constant term of the force $K_r$, but which otherwise does not interfere with the movement.

In the embodiments shown in Figs. 5 and 7, the fields produced by the coil 10 not only drive the disc 5 (or 5', or 5''), but also bring about a feedback voltage in the winding 8, leading to a steep rise of the current $i$, if desired till this current cannot increase further due to limitation in the output circuit of the amplifier 9. The advantageous effect of this limitation is that, if for some reason or other the disc 5 tends to exhibit a greater deviation, the duration of the pulses is shortened, but their amplitude is not increased, so that the driving energy decreases, thus counteracting the increase in deviation. Said limitation is enhanced by giving the resistance of the coil 10 a comparatively high value and the voltage of the source 24 a comparatively low value.

However, the feedback coupling between the coils 8 and 10 is required to be such that the amplifier 9 does not self-oscillate when the disc 5 (or 5' or 5'') is at rest. This in ensured by suitable choice of the number of turns and of the stray coefficient of the magnetic coupling between the coils 8 and 10 and, as the case may be, by utilizing in addition the natural input threshold voltage which a transistor amplifier may have.

Figure 12:
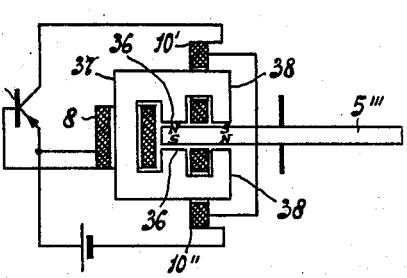
Fig. 12 is a side view of the embodiment of Fig. 7.
Figure 13:
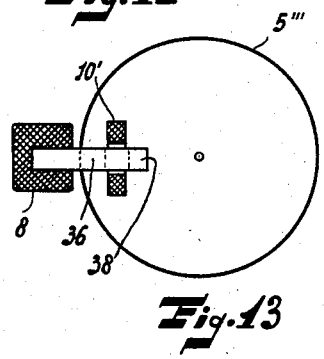
Figs. 13 and 14 are plan views of a modification of a portion of the embodiment of Fig. 7.
Figure 14:
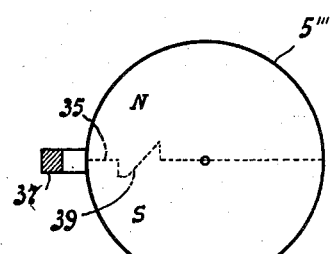

In the embodiment of Figs. 12 and 13, a partial solution of the said problem is given. The disc 5' of Fig. 7 is replaced by a disc 5''' having the pole surfaces N and S as shown in Fig. 14, a sudden reversal of the direction of magnetization occurring from the area 35 along the dotted line. The area 35, as before, corresponds to the zero position of the movement and produces a voltage pulse across coil 8 when passing along the limbs 36 of the weak-magnetic core 37 of coil 8, so that after amplification a current pulse flows through the coils 10' and 10'' connected in series. The limbs 38 are thus magnetized in a manner such that in cooperation with the magnetization at the area 39 on the disc 5''' they supply a tangentially directed driving force during the time in which the variation in the flux through the limb 36 occurs, that is symmetrical with respect to the zero position of the movement. However, when the movement is reversed, the corresponding voltage pulse produced in the coil 8 has the opposite polarity, at which the amplifier 9 is cut off and no driving force is produced. The weak-magnetic limbs 36 and 38 can still slightly brake the disc 5''', which implies an asymmetric variation of the force with respect to the zero position of the movement. If the braking force is small, however, the resultant interference in the movement is negligible.

It will be evident that the different examples are applicable in a similar manner to pendulums. As an alternative, it would be possible to arrange for the coils to perform the oscillating movement and for the permanent magnet to occupy a fixed position, although this may lead to more complicated constructions.

While the invention has been described by means of specific examples and in specific embodiments, I do not wish to be limited thereto, for obvious modifications will occur to those skilled in the art without departing from the spirit and scope of the invention.

What is claimed is:

1. Apparatus for maintaining mechanical oscillations, comprising a pickup coil, a permanent magnet system rotatively mounted in operative relation to said pickup coil, means urging a magnet of said system towards a zero position with respect to said pickup coil, said magnet having polarities so arranged with respect to said pickup coil that an electric pulse is produced by the said coil each time said magnet passes through a point near said zero position, means responsive to said pulses for exerting driving force pulses upon said magnet system thereby to sustain said system in oscillatory motion relative to said pickup coil, said pulse responsive means comprising a driving coil mounted in operative relation to said magnet system and means for amplifying said electric pulses connected between the output of said pickup coil and the input of said driving coil, and means for applying an auxiliary force to said magnet to oppose said driving force pulses in a manner whereby resultant driving force pulses which are substantially symmetrical with respect to the passing of said magnet through said zero position are provided.

2. Apparatus as claimed in claim 1, wherein said amplifying means is of push-pull type.

3. Apparatus as claimed in claim 1, wherein the polarities of said magnet are so arranged that there is a single reversal of the direction of magnetization of said magnet upon the passing of said magnet through a point near said zero position.

4. Apparatus as claimed in claim 3, wherein said magnet is substantially disc-shaped and wherein the magnetic strength of each polarity is a maximum at the point of reversal of the direction of magnetization of said magnet and gradually decreases as the distance from said point of reversal increases.

5. Apparatus as claimed in claim 1, wherein said amplifying means is of class B type and said last-mentioned means comprises an auxiliary magnet positioned in cooperative relation to said magnet.

6. Apparatus as claimed in claim 5, wherein said auxiliary magnet exerts upon the said magnet force pulses having a magnitude substantially half the magnitude of said driving force pulses.

7. Apparatus as claimed in claim 5, wherein said driving force pulses repel the said magnet.

8. Apparatus for maintaining mechanical oscillations, comprising a magnetic core, a pickup coil mounted on said core, a permanent magnet rotatively mounted in operative relation to said pickup coil, means urging said magnet toward a zero position with respect to said pickup coil, said magnet having polarities so arranged with respect to said pickup coil that an electric pulse is produced by the said coil each time said magnet passes through a point near said zero position, means responsive to said pulses for exerting driving force pulses upon said magnet thereby to sustain said magnet in oscillatory motion relative to said pickup coil, said pulse responsive means comprising a driving coil mounted on said core in operative relation to said magnet and means for amplifying said electric pulses connected between the output of said pickup coil and the input of said driving coil, and means for applying an auxiliary force to said magnet to oppose said driving force pulses in a manner whereby resultant driving force pulses which are substantially symmetrical with respect to the passing of said magnet through said zero position are provided.

9. Apparatus as claimed in claim 8, wherein said pickup and driving coils are so positioned on said core that the magnetic field produced by said driving coil substantially limits the amplitude of said electric pulses.

10. Apparatus for maintaining mechanical oscillations, comprising a plurality of pickup coils, a substantially disc-shaped permanent magnet rotatively mounted in operative relation to said pickup coils, means urging said magnet toward a zero position with respect to said pickup coils, said magnet having polarities so arranged with respect to said pickup coils that an electric pulse is produced by the said coils each time said magnet passes through a point near said zero position, there being a single reversal of the direction of magnetization of said magnet upon the passing of said magnet through a point near said zero position, means responsive to said pulses for exerting driving force pulses upon said magnet thereby to sustain said magnet in oscillatory motion relative to said pickup coils, said pulse responsive means comprising a plurality of driving coils mounted in operative relation to said magnet and means for amplifying said electric pulses connected between the outputs of said pickup coils and the inputs of said driving coils, said pickup coils being connected in series with said driving coils through said amplifying means, and means for applying an auxiliary force to said magnet to oppose said driving force pulses in a manner whereby resultant driving force pulses which are substantially symmetrical with respect to the passing of said magnet through said zero position are provided.

References Cited in the file of this patent

FOREIGN PATENTS 1,090,564    France _____ Oct. 20, 1954